United States Patent
Yi et al.

(10) Patent No.: US 10,917,202 B2
(45) Date of Patent: Feb. 9, 2021

(54) METHOD AND DEVICE FOR TRANSMITTING DATA UNIT, AND METHOD AND DEVICE FOR RECEIVING DATA UNIT

(71) Applicant: LG ELECTRONICS INC., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/349,063

(22) PCT Filed: Nov. 8, 2017

(86) PCT No.: PCT/KR2017/012589
§ 371 (c)(1),
(2) Date: May 10, 2019

(87) PCT Pub. No.: WO2018/088793
PCT Pub. Date: May 17, 2018

(65) Prior Publication Data
US 2019/0280826 A1    Sep. 12, 2019

Related U.S. Application Data

(60) Provisional application No. 62/421,266, filed on Nov. 12, 2016.

(51) Int. Cl.
*H04L 1/18*     (2006.01)
*H04W 80/02*    (2009.01)

(52) U.S. Cl.
CPC .............. *H04L 1/1861* (2013.01); *H04L 1/18* (2013.01); *H04L 1/1854* (2013.01); *H04L 1/1864* (2013.01); *H04W 80/02* (2013.01)

(58) Field of Classification Search
CPC ....... H04L 1/1861; H04L 1/1854; H04L 1/18; H04L 1/1864; H04W 80/02
See application file for complete search history.

(56) References Cited

U.S. PATENT DOCUMENTS

| | | | |
|---|---|---|---|
| 2009/0046631 A1* | 2/2009 | Meylan | H04W 80/02 370/328 |
| 2014/0056219 A1 | 2/2014 | Ye et al. | |
| 2014/0177647 A1 | 6/2014 | Chun et al. | |
| 2015/0023370 A1 | 1/2015 | Sammour et al. | |

(Continued)

OTHER PUBLICATIONS

MediaTek Inc., "User Plane Enhancements for TCP Performance," R2-168589, 3GPP TSG-RAN2#96 meeting, Reno, USA, Nov. 14-18, 2016, 3 pages.

(Continued)

*Primary Examiner* — Jae Y Lee
(74) *Attorney, Agent, or Firm* — Fish & Richardson P.C.

(57) ABSTRACT

In the present invention, a transmitting device receives, at a packet data convergence protocol (PDCP) layer, a PDCP service data unit (SDU) from an upper layer. The transmitting device generates, at the PDCP layer, a PDCP protocol data unit (PDU) containing the PDCP SDU. The transmitting device submits, at the PDCP layer, the PDCP PDU to a lower layer. If the PDCP SDU includes a transmission control protocol (TCP) ACK packet, the PDCP layer generates a PDCP control PDU as the PDCP PDU.

20 Claims, 11 Drawing Sheets

(56) References Cited

U.S. PATENT DOCUMENTS

2016/0234714 A1    8/2016  Mallick et al.
2018/0063854 A1*  3/2018  Kanamarlapudi .... H04L 1/1887
2019/0281655 A1*  9/2019  Kim ..................... H04W 80/02

OTHER PUBLICATIONS

China Telecom, Intel Corporation, "Uplink transmission of PDCP control PDU," R2-168271, 3GPP TSG-RAN WG2 Meeting #96, Reno, USA, Nov. 14-18, 2016, 2 pages.
PCT International Search Report and Written Opinion in International Application No. PCT/KR2017/012589, dated Feb. 6, 2018, 18 pages.
Extended European Search Report in European Application No. 17869095.4, dated Mar. 25, 2020, 8 pages.

* cited by examiner

FIG. 4
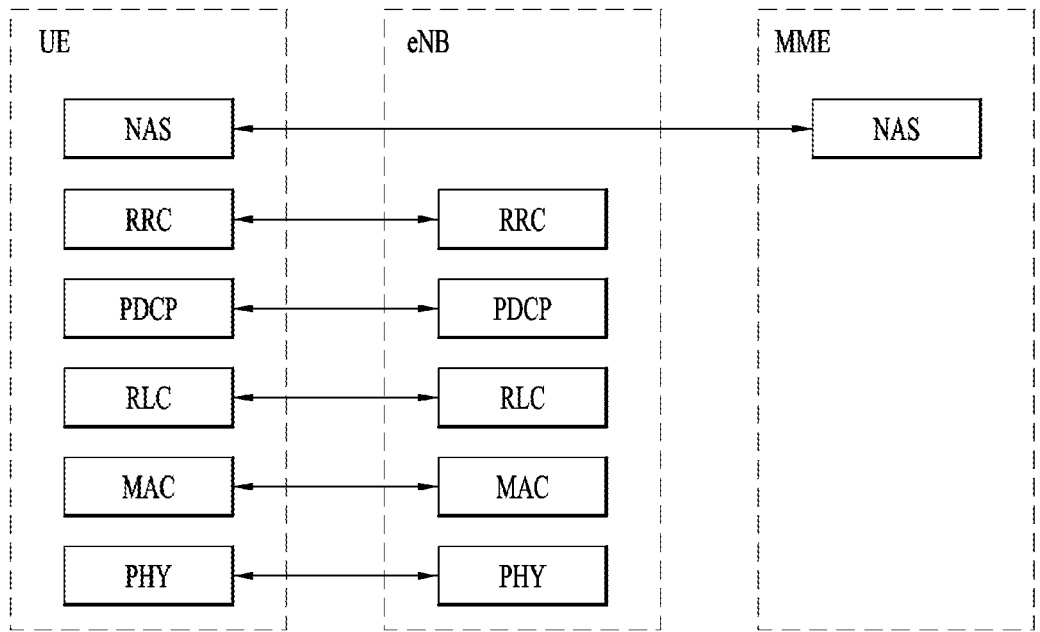
(a) Control-Plane Protocol Stack
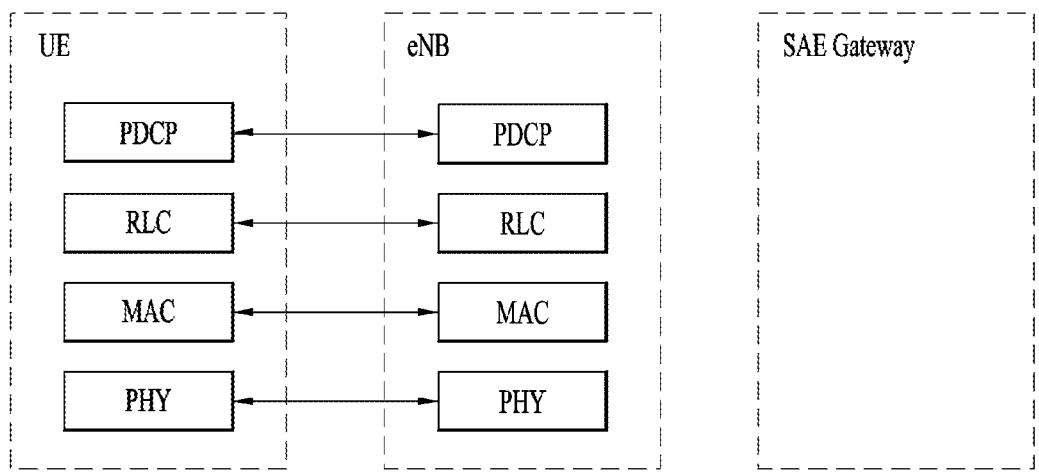
(b) User-Plane Protocol Stack

METHOD AND DEVICE FOR TRANSMITTING DATA UNIT, AND METHOD AND DEVICE FOR RECEIVING DATA UNIT

CROSS-REFERENCE TO RELATED APPLICATIONS

This application is a National Stage application under 35 U.S.C. § 371 of International Application No. PCT/KR2017/012589, filed on Nov. 8, 2017, which claims the benefit of U.S. Provisional Application No. 62/421,266, filed on Nov. 12, 2016. The disclosures of the prior applications are incorporated by reference in their entirety.

TECHNICAL FIELD

The present invention relates to a wireless communication system, and more particularly, to a method for transmitting/receiving data units and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of transmitting, by a transmitting device, a data unit in a wireless communication system. The method comprises: receiving, at a packet data convergence protocol (PDCP) layer, a PDCP service data unit (SDU) from an upper layer; generating, at the PDCP layer, a PDCP protocol data unit (PDU) containing the PDCP SDU; and submitting, at the PDCP layer, the PDCP PDU to a lower layer. If the PDCP SDU includes a transmission control protocol (TCP) ACK packet, the PDCP layer generates a PDCP control PDU as the PDCP PDU.

In another aspect of the present invention, provided herein is a method of receiving, by a receiving device, a data unit in a wireless communication system. The method comprises: receiving, at a packet data convergence protocol (PDCP) layer, a PDCP control protocol data unit (PDU) from a lower layer; and if the PDCP control PDU contains a PDCP service data unit (SDU), delivering, at the PDCP layer, the PDCP SDU to a upper layer. The PDCP SDU may include a transmission control protocol (TCP) ACK packet.

In a further aspect of the present invention, provided herein is a transmitting device for transmitting a data unit in a wireless communication system. The transmitting device comprises a radio frequency (RF) unit, and a processor configured to control the RF unit. The processor is configured to: receive, at a packet data convergence protocol (PDCP) layer, a PDCP service data unit (SDU) from an upper layer; generate, at the PDCP layer, a PDCP protocol data unit (PDU) containing the PDCP SDU; and submit, at the PDCP layer, the PDCP PDU to a lower layer. If the PDCP SDU includes a transmission control protocol (TCP) ACK packet, the processor is configured to generate, at the PDCP layer, a PDCP control PDU as the PDCP PDU.

In a still further aspect of the present invention, provided herein is a receiving device for receiving a data unit in a wireless communication system. The receiving device comprises a radio frequency (RF) unit, and a processor configured to control the RF unit. The processor is configured to: receive, at a packet data convergence protocol (PDCP) layer, a PDCP control protocol data unit (PDU) from a lower layer; and if the PDCP control PDU contains a PDCP service data unit (SDU), deliver, at the PDCP layer, the PDCP SDU to a upper layer. The PDCP SDU may include a transmission control protocol (TCP) ACK packet.

In each aspect of the present invention, the PDCP control PDU may contain a PDU type field set to indicate that the PDCP control PDU contains the PDCP SDU.

In each aspect of the present invention, the PDCP control PDU may contain a PDU type field set to indicate that the PDCP control PDU contains the TCP ACK packet.

In each aspect of the present invention, the PDCP control PDU may contain a length field indicating a length of the PDCP SDU.

In each aspect of the present invention, at the transmitting device, the PDCP control PDU may be submitted to the lower layer immediately after the PDCP control PDU is generated and even if there are PDCP PDUs stored in a buffer waiting for transmission.

In each aspect of the present invention, the PDCP layer at the transmitting device may not attach a PDCP SN to the PDCP SDU when generating the PDCP control PDU.

In each aspect of the present invention, if the PDCP SDU is a second type SDU, the PDCP layer at the transmitting device may attach an PDCP SN to the PDCP SDU to generate a PDCP data PDU as the PDCP PDU.

In each aspect of the present invention, the transmitting device may transmit the PDCP PDU to the receiving device.

In each aspect of the present invention, the PDCP layer at the receiving device may reassemble the PDCP SDU and deliver it to the upper layer above the PDCP layer after reassembling it.

In each aspect of the present invention, the receiving device may receive the PDCP PDU from the transmitting device.

In each aspect of the present invention, the transmitting or receiving device may be an autonomous vehicle that communicates with at least one of a mobile terminal, a network, or another autonomous vehicle other than the device. The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 4 is a diagram showing a control plane and a user plane of a radio interface protocol between a UE and an E-UTRAN based on a 3GPP radio access network standard.

MODE FOR INVENTION

Figure 1:
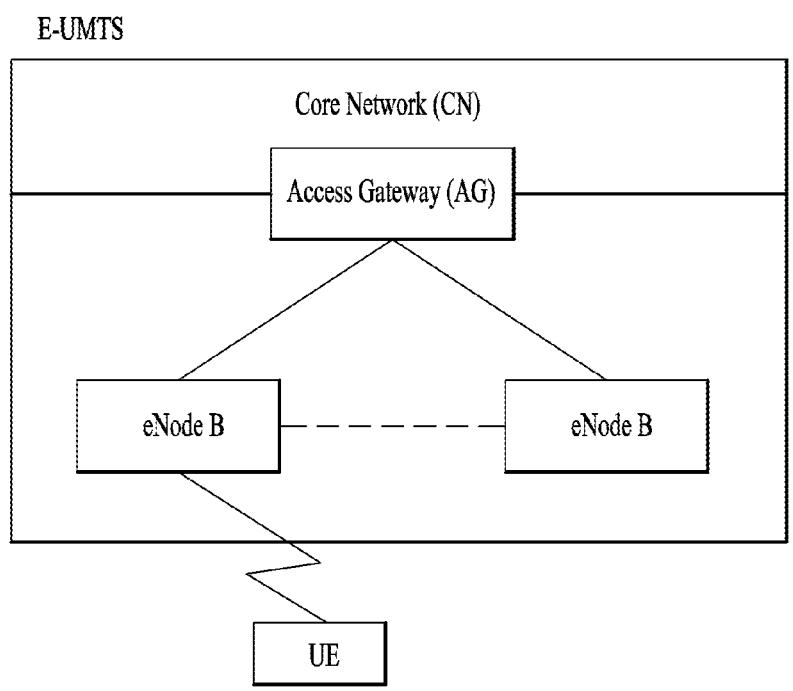
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS).

The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, a EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "G-RNTI" refers to a group RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331 may be referenced.

Figure 2:
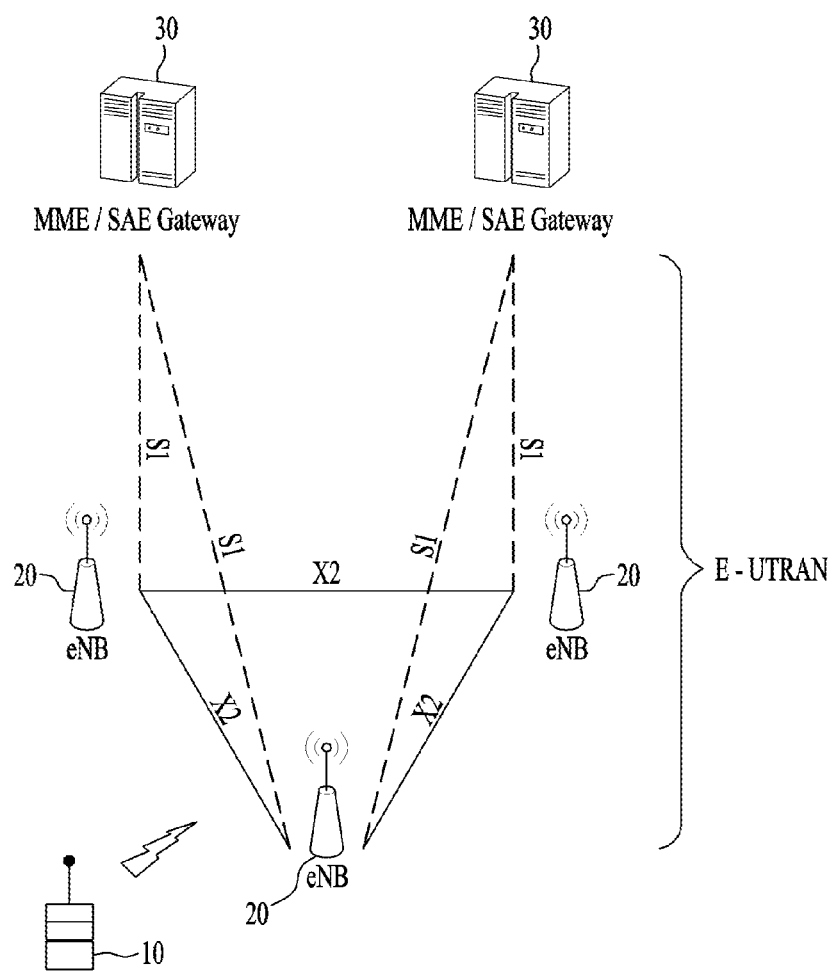
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
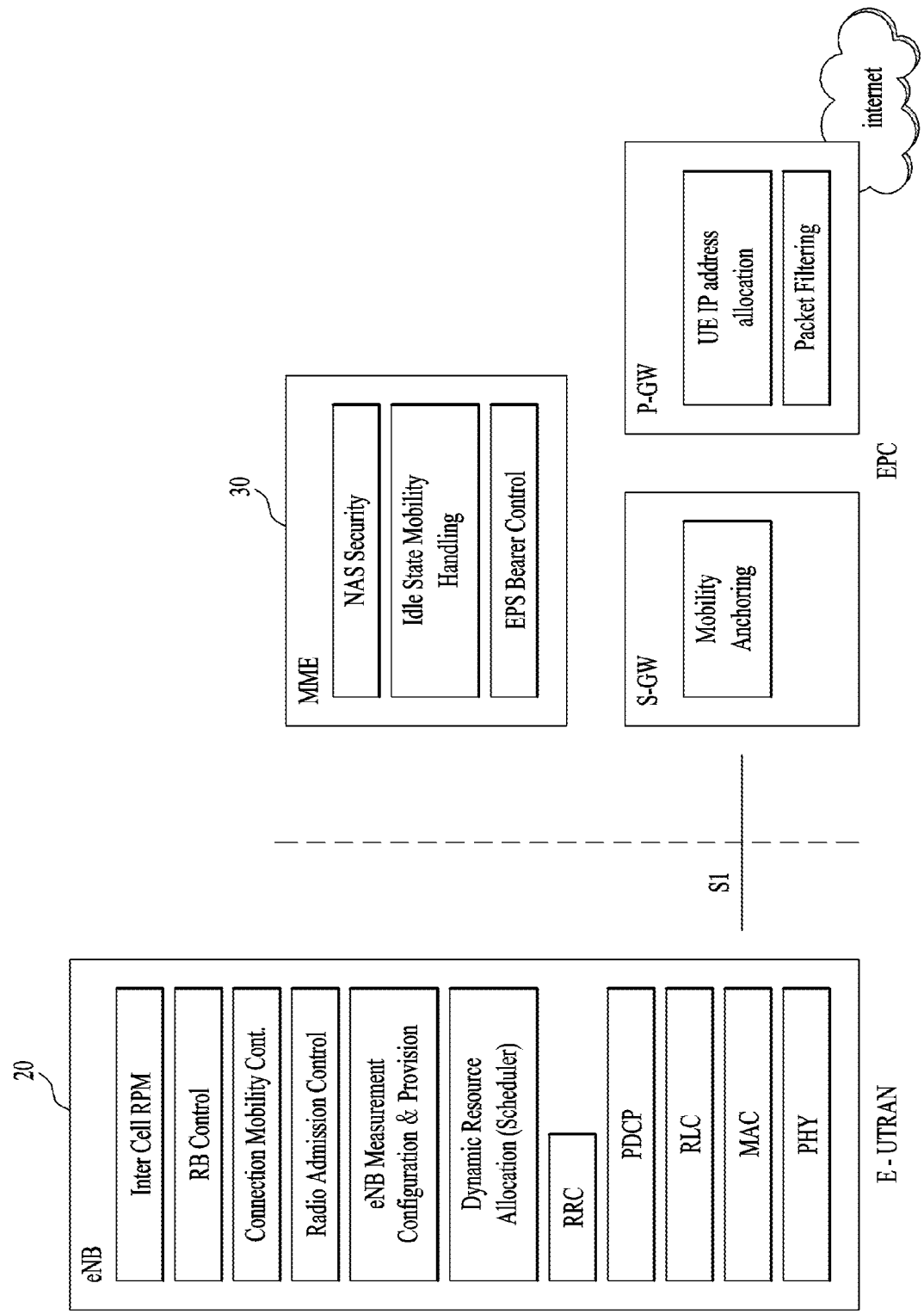
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
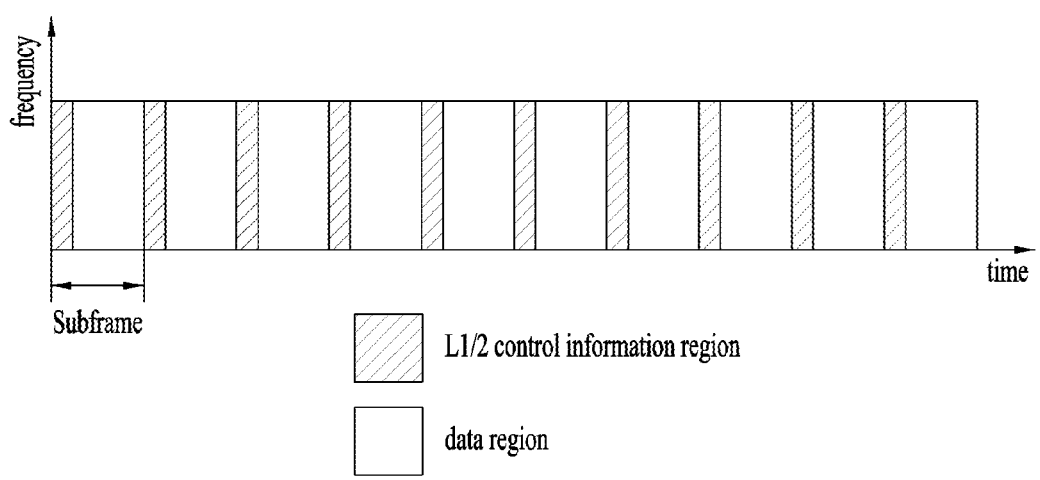
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID). The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed. After performing the procedure described above, the UE may perform PDCCH/PDSCH reception and PUSCH/PUCCH transmission as a typical procedure of transmission of an uplink/downlink signal.

Figure 6:
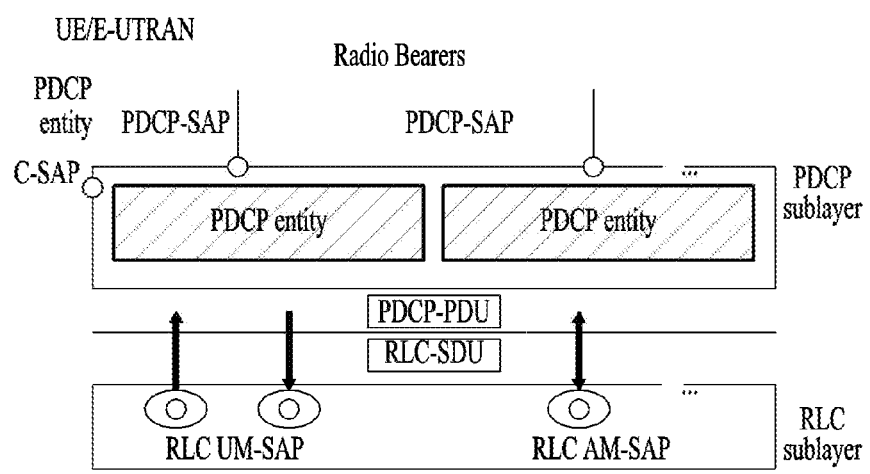
FIG. 6 illustrates an example of one possible structure for the PDCP sublayer.

FIG. 6 illustrates an example of one possible structure for the PDCP sublayer.

Each radio bearer (RB) (i.e. data radio bearer (DRB), sidelink radio bearer (SLRB) and signaling radio bearer (SRB), except for SRB0 and SRB1bis) is associated with one PDCP entity. Each PDCP entity is associated with one or two (one for each direction) RLC entities depending on the RB characteristic (i.e. uni-directional or bi-directional) and RLC mode. For split bearers, each PDCP entity is associated with two AM RLC entities. For LTE-WLAN Aggregation (LWA) bearers, each PDCP entity is associated with an AM RLC entity and the LWAAP entity. The PDCP entities are located in the PDCP sublayer. The PDCP sublayer is configured by upper layers (e.g., RRC layer). The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

Figure 7:
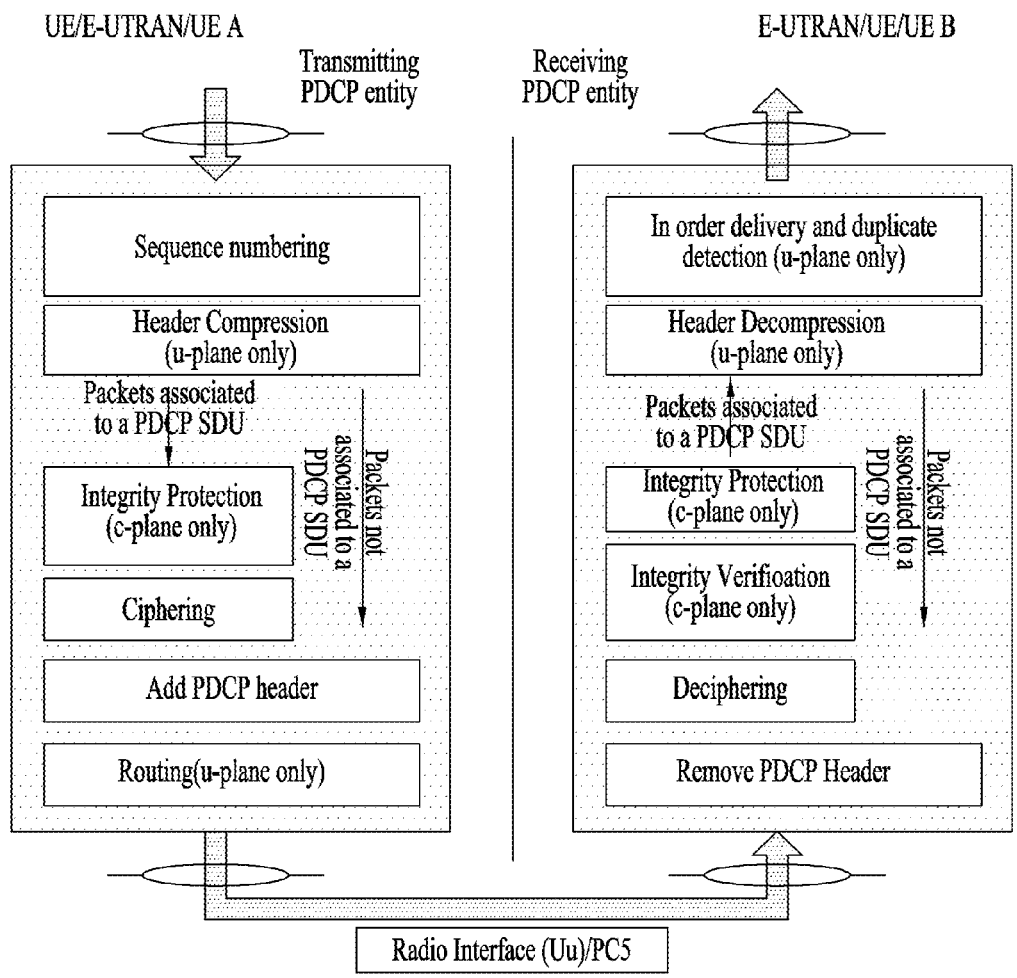
FIG. 7 illustrates the functional view of the PDCP entity for the PDCP sublayer.

FIG. 7 illustrates the functional view of the PDCP entity for the PDCP sublayer.

The PDCP supports the following functions: header compression and decompression of IP data flows using the ROHC protocol; transfer of data (user plane or control plane); maintenance of PDCP SNs; in-sequence delivery of upper layer protocol data units (PDUs) at re-establishment of lower layers; duplicate elimination of lower layer service data units (SDUs) at re-establishment of lower layers for radio bearers mapped on RLC AM; ciphering and deciphering of user plane data and control plane data; integrity protection and integrity verification of control plane data; integrity protection and integrity verification of sidelink one-to-one communication data; for RNs, integrity protection and integrity verification of user plane data; timer based discard; duplicate discarding; and/or for split and LWA bearers, routing and reordering.

For split bearers, routing is performed in the transmitting PDCP entity, and reordering is performed in the receiving PDCP entity. For LWA bearers, routing is performed in the transmitting PDCP entity and reordering is performed in the receiving PDCP entity. The transmitting PDCP entity of the UE shall only submit the PDCP PDUs to the associated AM RLC entity.

PDCP provides its services to the RRC and user plane upper layers at the UE or to the relay at the evolved Node B (eNB). The following services are provided by PDCP to upper layers: transfer of user plane data; transfer of control plane data; header compression; ciphering; and/or integrity protection.

A PDCP entity expects the following services from lower layers per RLC entity: acknowledged data transfer service, including indication of successful delivery of PDCP PDUs; unacknowledged data transfer service; in-sequence delivery, except at re-establishment of lower layers; and/or duplicate discarding, except at re-establishment of lower layers.

There are two types of PDCP PDU: PDCP Data PDU and PDCP Control PDU. A PDCP PDU is a bit string that is byte aligned (i.e. multiple of 8 bits) in length. The PDCP Data PDU is used to convey:

a PDCP SDU SN; and for SLRBs used for one-to-many communication, ProSe Group Key (PGK) Index, ProSe Traffic Key (PTK) Identity, and SDU type; or for SLRBs used for one-to-one communication, KD-sess Identity, and SDU type; and user plane data containing an uncompressed PDCP SDU; or user plane data containing a compressed PDCP SDU; or control plane data; and a MAC-I field for SRBs; or for the SLRB that needs integrity protection for one-to-one communication, a MAC-I field; or for RNs, a MAC-I field for DRB (if integrity protection is configured).

PDCP SDUs are bit strings that are byte aligned (i.e. multiple of 8 bits) in length. In the legacy LTE system, a compressed or uncompressed SDU is included into a PDCP Data PDU. The PDCP Control PDU is used to convey:

a PDCP status report indicating which PDCP SDUs are missing and which are not following a PDCP re-establishment.

header compression control information, e.g. interspersed ROHC feedback.

a LWA status report.

Figure 8:
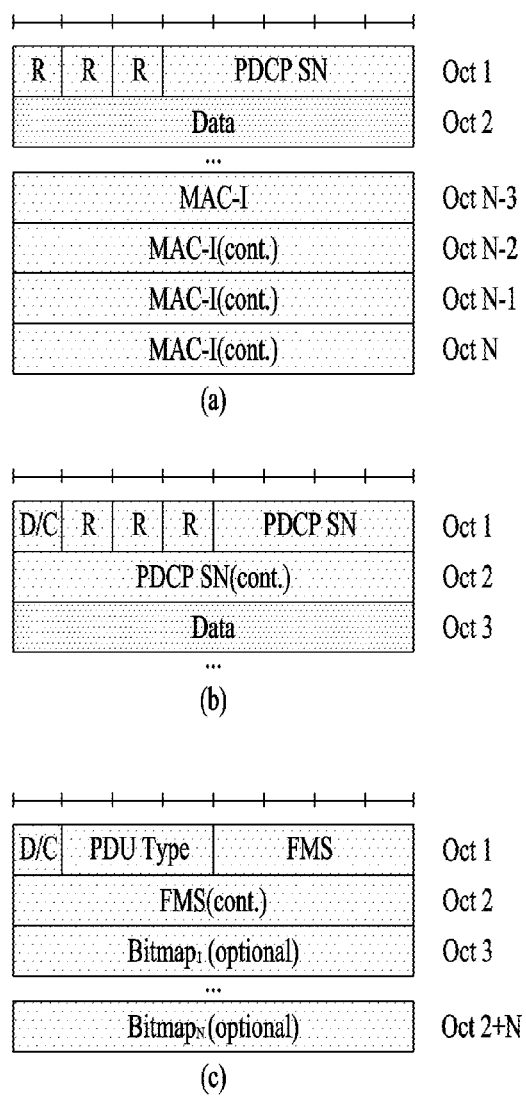
FIG. 8 shows formats of PDCP Data PDU used in the legacy LTE system.

FIG. 8 shows formats of PDCP Data PDU used in the legacy LTE system. FIG. 8(a) shows the format of the control plane PDCP Data PDU carrying data for control plane SRBs. FIG. 8(b) shows the format of the user plane PDCP Data PDU when a 12 bit SN length is used. FIG. 8(c) shows one of the formats of PDCP Control PDU. Especially, FIG. 8(c) shows the format of the PDCP Control PDU carrying one interspersed ROHC feedback packet. Similar to the format of the PDCP Control PDU shown at FIG. 8(c), the PDCP Control PDU carrying one PDCP status report includes D/C field and PDP Type field in the PDCP header.

The Data field in the PDCP Data PDU may include either one of the following: uncompressed PDCP SDU (user plane data, or control plane data); or compressed PDCP SDU (user plane data only).

The D/C field indicates whether a corresponding PDCP PDU is a PDCP Control PDU or PDCP Data PDU, as shown in Table 1.

TABLE 1

| Bit | Description |
| --- | --- |
| 0 | Control PDU |
| 1 | Data PDU |

If the D/C field indicates that a corresponding PDCP PDU is a PDCP Control PDU, then the header of the PDCP PDU further contains the PDU type field. The PDCP type field indicates the type of the contents included in the PDCP Control PDU, as shown in Table 2.

TABLE 2

| Bit | Description |
| --- | --- |
| 000 | PDCP status report |
| 001 | Interspersed ROHC feedback packet |
| 010 | LWA status report |
| 011-111 | reserved |

The following Table shows PDCP SDU type used in the legacy LTE system. The SDU Type field (3 bits) in the PDCP header is used to discriminate between IP, ARP and PC5. For PDCP SDU type "Non-IP", a "Non-IP Type" header is included in the SDU by upper layer to indicate the type of non-IP messages carried as specified in TS 3GPPP TS 24.334. The PDCP entity may handle the SDU differently per SDU Type, e.g. header compression is applicable to IP SDU but not ARP SDU and Non-IP SDU.

TABLE 3

| Bit | Description |
| --- | --- |
| 000 | IP |
| 001 | ARP |
| 010 | PC5 Signaling |
| 011 | Non-IP |
| 100-111 | reserved |

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future. Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) system (also referred to as 5G new RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

During the study and discussion for the NR system, it was proposed that out-of-order delivery of PDCP PDUs from the RLC layer is desirable for several reasons, e.g., in avoiding instances of "bursty" PDCP deciphering, and reducing latency (especially for multi-connectivity scenarios), and it was agreed that PDCP PDUs can be delivered and deciphered out-of-order. Accordingly, in the NR system. Some relevant agreements on this topic for the NR system are as follows:
- out-of-order deciphering of PDCP PDUs is not prohibited;
- complete PDCP PDUs can be delivered out-of-order from RLC to PDCP. RLC delivers PDCP PDUs to PDCP after the PDU is reassembled;
- PDCP reordering is always enabled at receiving PDCP entity if in sequence delivery to layers above PDCP is needed.

One of the upper layers of the PDCP entity is the transmission control protocol (TCP) layer. The TCP packet is encapsulated into IP packet, and the IP packet is transmitted through PDCP. The IP packet is always associated to a PDCP SDU. Thus, one type of PDCP SDU is an IP packet (see Table 3) including TCP packet. The TCP ACK packet is a feedback of received TCP packets, and transmitted in the opposite direction to the TCP packet. In other words, if TCP packet is transmitted in downlink, the TCP ACK packet is transmitted in uplink, and vice versa. The TCP ACK packet is also encapsulated into IP packet, and transmitted through PDCP. Thus, an IP packet including TCP ACK packet is also one type of PDCP SDU.

TCP is the predominant transport layer protocol whose performance depends in a somewhat complex fashion on various system parameters. For example, the so-called Mathis equations models TCP throughput as (C*MSS)/(RTT*vp), where C is some constant, MSS is the maximum segment size, RTT is the TCP layer round-trip transit time (RTT) and p is the packet loss probability. Since TCP is a self-clocking protocol, it is not surprising that TCP throughput is inversely proportional to RTT. It is well known that reducing RTT is known to improve performance. A straightforward mechanism to improve TCP RTT is to reduce the delay of TCP ACKs in both the transmitter and receiver sides. Namely, TCP ACK is one of main hurdles in maximizing TCP throughput.

To increase the TCP throughput, it is important to transmit TCP ACK as early as possible. However, the PDCP does not inspect the contents of the PDCP SDU (i.e. IP packet), and thus the PDCP does not differentiate TCP and TCP ACK packets.

For the prioritization of TCP ACK packet over TCP packet, one of the mechanisms is proposed in R2-168589 that the PDCP inspect the contents of the PDCP SDU, and prioritize the TCP ACK by changing the transmission order of TCP ACK packets earlier than TCP packets, and adding Marking Flag in the PDCP header. However, this mechanism requires additional field in PDCP header, and also requires special handling mechanism in the PDCP receiver. The present invention proposes another solution for maximizing TCP throughput, by transmitting TCP ACK using PDCP Control PDU.

Figure 9:
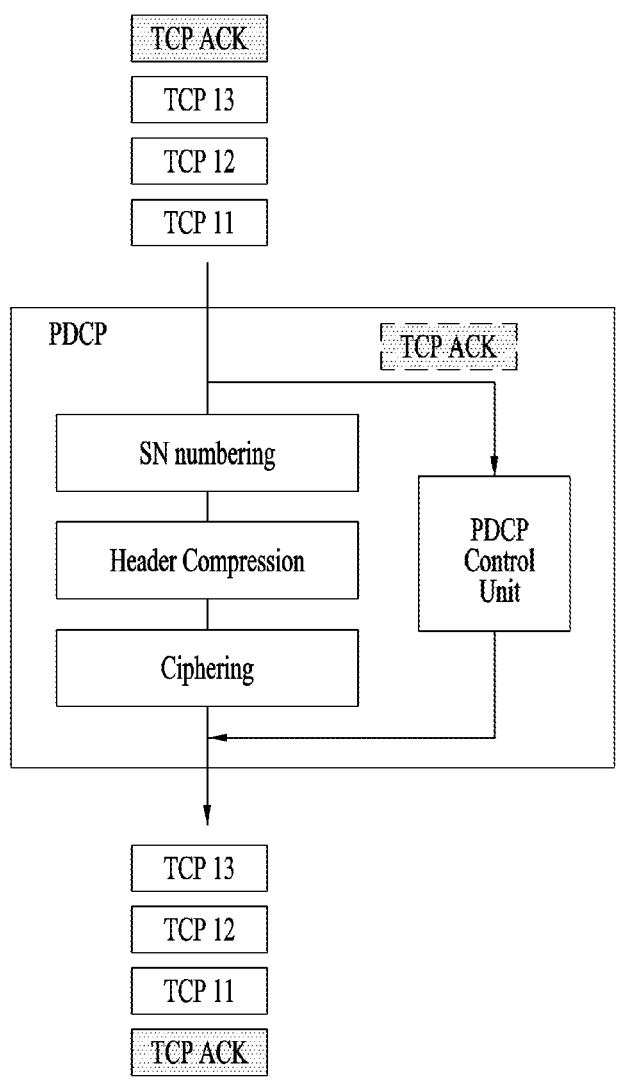
FIG. 9 illustrates an example of a method for transmitting PDCP SDUs according to the present invention.

FIG. 9 illustrates an example of a method for transmitting PDCP SDUs according to the present invention.

In the present invention, when the PDCP transmitter receives an IP packet including TCP ACK from an upper layer, the PDCP entity maps the IP packet onto a PDCP Control PDU, and delivers the PDCP Control PDU immediately to a lower layer, e.g. RLC layer or LWAAP layer, earlier than other already stored PDCP SDUs.

When the PDCP transmitter receives an IP packet from an upper layer, the PDCP transmitter inspects the contents of the PDCP SDU, i.e. IP packet, to figure out whether the PDCP SDU includes TCP ACK. If the PDCP transmitter finds that the PDCP SDU includes TCP ACK, the PDCP transmitter includes the PDCP SDU (e.g., TCP ACK at FIG. 9) into a PDCP Control PDU. The PDCP transmitter does not associate a PDCP SN to the PDCP SDU, does not apply header compression to the PDCP SDU, and does not apply ciphering or integrity protection to the PDCP SDU. If the PDCP transmitter finds that the PDCP SDU does not include TCP ACK, the PDCP transmitter includes the PDCP SDU (e.g., TCP 11, TCP 12 or TCP 13 at FIG. 9) into a PDCP Data PDU. The PDCP transmitter associates a PDCP SN to the PDCP SDU, applies header compression to the PDCP SDU, and applies ciphering or integrity protection to the PDCP SDU. In the legacy LTE system, a PDCP SDU is not included in a PDCP Control PDU, but always included in a PDCP Data PDU.

If the PDCP transmitter maps TCP ACK packets to PDCP Control PDU as the present invention proposes, the TCP ACK transmission is naturally prioritized over TCP transmission because TCP packets are transmitted on PDCP Data PDU, and PDCP Control PDU is usually prioritized over PDCP Data PDU. Moreover, no special handling is required in PDCP receiver for out-of-order delivery because the PDCP Control PDU does not have any PDCP SN, and thus there is no need for waiting for packet reordering.

One value of the PDU Type field is assigned to the PDCP Control PDU including TCP ACK. For example, the PDU Type=011 indicates that the PDCP Control PDU includes TCP ACK, as shown in Table 4.

TABLE 4

| Bit | Description |
| --- | --- |
| 000 | PDCP status report |
| 001 | Interspersed ROHC feedback packet |
| 010 | LWA status report |
| 011 | PDCP SDU including TCP ACK |
| 100-111 | reserved |

Figure 10:
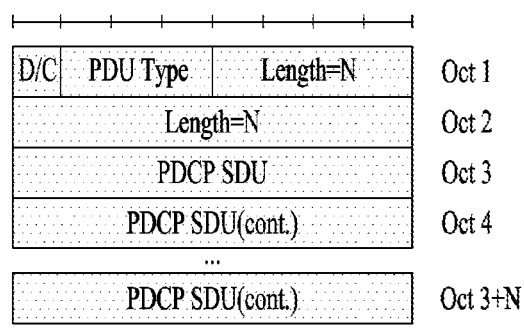
FIG. 10 illustrates an example of a PDCP Control PDU format according to the present invention.

FIG. 10 illustrates an example of a PDCP Control PDU format according to the present invention.

Referring to FIG. 10, the PDCP Control PDU format for PDCP SDU including TCP ACK may be composed of D/C field, PDU Type field, Length field, and PDCP SDU fields. The D/C field indicates whether the PDCP PDU is a PDCP Data PDU or a PDCP Control PDU. The PDU Type field indicates what kind of contents is included in the PDCP Control PDU. The Length field indicates the length of the PDCP SDU field included in the PDCP Control PDU. In FIG. 10, the Length field is 12 bits, but it could be shorter than 12 bits, e.g. 4 bits. The PDCP SDU field is an IP packet including TCP ACK.

When the PDCP transmitter constructs a PDCP Control PDU including TCP ACK, the PDCP transmitter delivers it to a lower layer, e.g. RLC layer or LWAAP layer, immediately even if there are other PDCP SDUs stored in the PDCP SDU buffer or other PDCP Data PDUs waiting for transmission. In other words, the PDCP transmitter prioritizes the PDCP Control PDU including TCP ACK for transmission over other PDCP Data PDUs. The PDCP transmitter may also prioritizes the PDCP Control PDU including TCP ACK for transmission over other PDCP Control PDUs not including TCP ACK.

When the PDCP receiver receives a PDCP Control PDU from a lower layer, e.g. RLC layer or LWAAP layer, the PDCP receiver checks the PDU Type of the PDCP Control PDU. If the PDU Type is set to a PDCP SDU including TCP ACK, the PDCP receiver reassembles the PDCP SDU based on the Length field. Then, the PDCP receiver delivers the reassembled PDCP SDU to the upper layer even if there are other PDCP SDUs or PDCP PDUs stored in the buffer for reordering. The PDCP receiver does not apply deciphering or integrity verification to the reassembled PDCP SDU, and does not apply header decompression to the reassembled PDCP SDU. A PDCP layer in the legacy LTE system does not delivers contents contained in a PDCP Control PDU to the upper layer, whereas a PDCP layer in the present invention delivers the contents contained in the PDCP Control PDU to the upper layer if the contents contained in the PDCP Control PDU is TCP ACK.

In the above description, the present invention has been described using TCP ACK. The present invention can also be applied to PDCP SDUs that are important than other PDCP SDUs and allow out-of-order delivery to upper layers. The PDCP SDUs that allow out-of-order delivery to upper layers means that the deliver order of PDCP SDUs to upper layers in the PDCP receiver can be different from the reception order of PDCP SDUs from an upper layer in the PDCP transmitter. In short, when the PDCP transmitter receives a PDCP SDU, that allows out of-order delivery, from an upper layer, the PDCP transmitter maps the PDCP SDU into a PDCP Control PDU and transmits the PDCP SDU to the PDCP receiver as one type of PDCP Control PDU.

Figure 11:
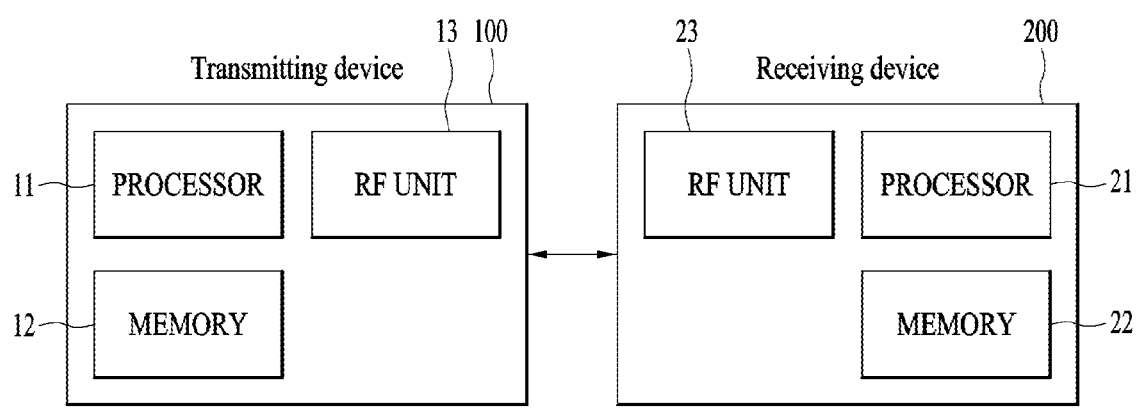
FIG. 11 is a block diagram illustrating elements of a transmitting device 100 and a receiving device 200 for implementing the present invention.

FIG. 11 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The PDCP transmitter according to the present invention may be configured in or implemented with a processor of a transmitting device. In other words, the PDCP transmitter mentioned in the present invention may be corresponding to a PDCP layer in the processor of the transmitting device. The PDCP receiver according to the present invention may be configured in or implemented with a processor of a receiving device. In other words, the PDCP receiver mentioned in the present invention may be corresponding to a PDCP layer in the processor of the receiving device.

A PDCP layer at a processor of a transmitting device receives a PDCP SDU from an upper layer above the PDCP layer, generates a PDCP PDU containing the PDCP SDU, and submits the PDCP PDU to a lower layer. If the PDCP SDU includes a TCP ACK packet, the PDCP layer generates a PDCP control PDU as the PDCP PDU. At the PDCP layer, the processor may generate the PDCP control PDU to contain a PDU type field set to indicate that the PDCP control PDU contains the PDCP SDU. The processor may generate the PDCP control PDU to contain a PDU type field set to indicate that the PDCP control PDU contains the TCP ACK packet. The processor may generate the PDCP control PDU to contain a length field indicating a length of the PDCP SDU. The processor may submit the PDCP control PDU from the PDCP layer to the lower layer immediately after the PDCP control PDU is generated and even if there are PDCP PDUs stored in a buffer waiting for transmission. The PDCP layer (i.e. the processor) may not attach a PDCP SN to the PDCP SDU when generating the PDCP control PDU. If the PDCP SDU is a second type SDU, the PDCP layer attaches an PDCP SN to the PDCP SDU to generate a PDCP data PDU as the PDCP PDU. The processor is configured to control a RF unit of the transmitting device to transmit the PDCP PDU to a receiving device.

A PDCP layer at a processor of a receiving device receives a PDCP control protocol data unit (PDU) from a lower layer. If the PDCP control PDU contains a PDCP SDU, the PDCP layer (i.e. the processor) delivers the PDCP SDU to a upper layer above the PDCP layer. The PDCP SDU includes TCP ACK packet. The PDCP control PDU containing the PDCP SDU may further contain a PDU type field set to indicate that the PDCP control PDU contains the PDCP SDU. The PDCP control PDU containing the PDCP SDU may further contain a length field indicating a length of the PDCP SDU. The processor may reassemble the PDCP SDU at the PDCP layer based on the length field, and delivered to the upper layer immediately after reassembled at the PDCP layer. The processor may control a RF unit of the receiving device to receive the PDCP control PDU from a transmitting device.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for transmitting, by a transmitting device, a data unit in a wireless communication system, the method comprising:
   receiving, at a packet data convergence protocol (PDCP) layer, a PDCP service data unit (SDU) from an upper layer;
   generating, at the PDCP layer, a PDCP protocol data unit (PDU) containing the PDCP SDU; and
   submitting, at the PDCP layer, the PDCP PDU to a lower layer,
   wherein generating, at the PDCP layer, the PDCP PDU containing the PDCP SDU comprises:
   based on the PDCP SDU including a transmission control protocol (TCP) acknowledgement (ACK) packet, generating a PDCP control PDU containing the PDCP SDU as the PDCP PDU without applying header compression and ciphering to the PDCP SDU.

2. The method according to claim 1,
   wherein the PDCP control PDU includes a PDU type field set to indicate that the PDCP control PDU contains the PDCP SDU.

3. The method according to claim 1,
   wherein the PDCP control PDU includes a PDU type field set to indicate that the PDCP control PDU contains the TCP ACK packet.

4. The method according to claim 1, wherein submitting, at the PDCP layer, the PDCP PDU to the lower layer comprises:
   submitting the PDCP control PDU to the lower layer immediately after generating the PDCP control PDU in a state in which there are PDCP PDUs stored in a buffer waiting for transmission.

5. The method according to claim 1,
   wherein the PDCP control PDU does not include a PDCP sequence number (SN).

6. The method according to claim 1, wherein generating, at the PDCP layer, the PDCP PDU containing the PDCP SDU comprises:
   based on the PDCP SDU including no TCP ACK packet, (i) applying header compression and ciphering to the PDCP SDU and (ii) generating, at the PDCP layer, a PDCP data PDU including the header compressed and ciphered PDCP SDU as the PDCP PDU,
   wherein the PDCP data PDU includes a PDCP sequence number (SN) for the PDCP SDU.

7. The method according to claim 1, further comprising:
   transmitting the PDCP PDU to a receiving device.

8. The method according to claim 1,
   wherein the transmitting device is an autonomous vehicle that communicates with at least a mobile terminal, a network, or another autonomous vehicle other than the transmitting device.

9. A method for receiving, by a receiving device, a data unit in a wireless communication system, the method comprising:

receiving, at a packet data convergence protocol (PDCP) layer, a PDCP control protocol data unit (PDU) from a lower layer; and based on the PDCP control PDU containing a PDCP service data unit (SDU), (i) reassembling, at the PDCP layer, the PDCP SDU based on the PDCP control PDU and (ii) delivering, at the PDCP layer, the reassembled PDCP SDU to a upper layer without applying deciphering and header decompression to the reassembled PDCP SDU, wherein the PDCP SDU included in the PDCP control PDU includes a transmission control protocol (TCP) acknowledgement (ACK) packet.

10. The method according to claim 9,
wherein the PDCP control PDU containing the PDCP SDU further includes a PDU type field set to indicate that the PDCP control PDU contains the PDCP SDU.

11. The method according to claim 9,
wherein the PDCP control PDU containing the PDCP SDU further includes a length field indicating a length of the PDCP SDU.

12. The method according to claim 11, wherein reassembling, at the PDCP layer, the PDCP SDU based on the PDCP control PDU comprises:
reassembling, at the PDCP layer, the PDCP SDU based on the length field, and,
wherein delivering, at the PDCP layer, the reassembled PDCP SDU to the upper layer comprises:
delivering, at the PDCP layer, the reassembled PDCP SDU immediately after reassembling the PDCP SDU.

13. The method according to claim 9, further comprising:
receiving the PDCP control PDU from a transmitting device.

14. A transmitting device configured to transmit a data unit in a wireless communication system, the transmitting device comprising:
a radio frequency (RF) transceiver, and
a processor, and
a memory storing at least one program that causes the processor to perform operations comprising:
receiving, at a packet data convergence protocol (PDCP) layer, a PDCP service data unit (SDU) from an upper layer;
generating, at the PDCP layer, a PDCP protocol data unit (PDU) containing the PDCP SDU; and
submitting, at the PDCP layer, the PDCP PDU to a lower layer, wherein generating, at the PDCP layer, the PDCP PDU containing the PDCP SDU comprises:
based on the PDCP SDU including a transmission control protocol (TCP) acknowledgement (ACK) packet, generating a PDCP control PDU containing the PDCP SDU as the PDCP PDU without applying header compression and ciphering to the PDCP SDU.

15. The transmitting device according to claim 14,
wherein the PDCP control PDU includes a PDU type field set to indicate that the PDCP control PDU contains the PDCP SDU.

16. The transmitting device according to claim 14,
wherein the PDCP control PDU includes a PDU type field set to indicate that the PDCP control PDU contains the TCP ACK packet.

17. The transmitting device according to claim 14, wherein the operations further comprise:
transmitting, through the RF transceiver, the PDCP PDU to a receiving device.

18. A receiving device configured to receive a data unit in a wireless communication system, the receiving device comprising:
a radio frequency (RF) transceiver,
a processor, and
a memory storing at least one program that causes the processor to perform operations comprising:
receiving, at a packet data convergence protocol (PDCP) layer, a PDCP control protocol data unit (PDU) from a lower layer; and
based on the PDCP control PDU containing a PDCP service data unit (SDU), (i) reassembling, at the PDCP layer, the PDCP SDU based on the PDCP control PDU and (ii) delivering, at the PDCP layer, the reassembled PDCP SDU to a upper layer without applying deciphering and header decompression to the reassembled PDCP SDU,
wherein the PDCP SDU included in the PDCP control PDU includes a transmission control protocol (TCP) acknowledgement (ACK) packet.

19. The receiving device according to claim 18,
wherein the PDCP control PDU containing the PDCP SDU further includes a PDU type field set to indicate that the PDCP control PDU contains the PDCP SDU.

20. The receiving device according to claim 18, wherein the operations further comprise:
receiving, through the RF transceiver, the PDCP control PDU from a transmitting device.

* * * * *